(12) United States Patent
Hertel

(10) Patent No.: US 11,364,686 B2
(45) Date of Patent: Jun. 21, 2022

(54) METHOD FOR OPERATING AN APPARATUS FOR ADDITIVELY MANUFACTURING OF THREE-DIMENSIONAL OBJECTS

(71) Applicant: CONCEPT LASER GMBH, Lichtenfels (DE)

(72) Inventor: Kai Hertel, Breitengüßbach (DE)

(73) Assignee: CONCEPT LASER GMBH, Lichtenfels (DE)

( * ) Notice: Subject to any disclaimer, the term of this patent is extended or adjusted under 35 U.S.C. 154(b) by 366 days.

(21) Appl. No.: 16/165,500

(22) Filed: Oct. 19, 2018

(65) Prior Publication Data
US 2019/0118483 A1 Apr. 25, 2019

(30) Foreign Application Priority Data
Oct. 20, 2017 (EP) ..................................... 17197619

(51) Int. Cl.
*B29C 64/393* (2017.01)
*B33Y 10/00* (2015.01)
(Continued)

(52) U.S. Cl.
CPC ............ *B29C 64/393* (2017.08); *B22F 10/20* (2021.01); *B28B 1/001* (2013.01);
(Continued)

(58) Field of Classification Search
CPC .................................................. B29C 64/393
(Continued)

(56) References Cited

U.S. PATENT DOCUMENTS

| 6,097,523 A | * | 8/2000 | Boot ..................... H01S 5/0608 398/68 |
| 10,335,901 B2 | | 7/2019 | Ferrar et al. |

(Continued)

FOREIGN PATENT DOCUMENTS

| CN | 102281610 A | 12/2011 |
| CN | 104182178 A | 12/2014 |

(Continued)

OTHER PUBLICATIONS

Machine Translated Japanese Search Report Corresponding to Application No. 2018105772 dated Jul. 19, 2019.
(Continued)

*Primary Examiner* — Francisco W Tschen
*Assistant Examiner* — Wayne K. Swier
(74) *Attorney, Agent, or Firm* — Dority & Manning, P.A.

(57) ABSTRACT

Method for operating at least one apparatus for additively manufacturing of three-dimensional objects by means of successive layerwise selective irradiation and consolidation of layers of a build material which can be consolidated by means of an energy beam, wherein at least one object is being built by successively irradiating layers of the object in a build plane, wherein at least one part of at least one layer of the object is assigned to be irradiated by a first energy beam and at least one other part of at least one layer of the object is assigned to be irradiated by another energy beam, wherein the parts of layers are assigned to be irradiated by one of the at least two energy beams based on a Huffman coding.

20 Claims, 2 Drawing Sheets

Figure 1:
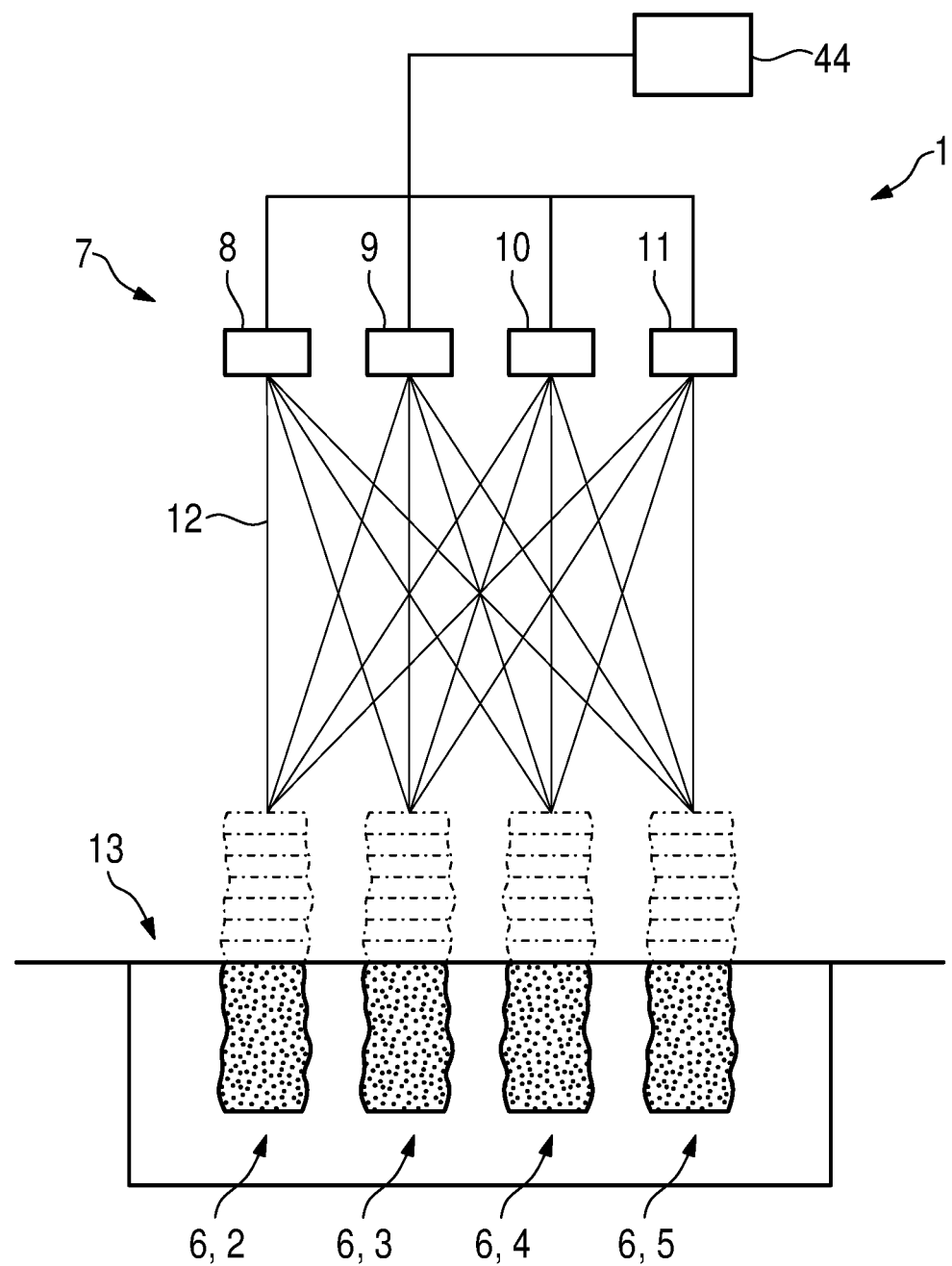

(51) Int. Cl.
| | |
|---|---|
| *B33Y 30/00* | (2015.01) |
| *B33Y 50/02* | (2015.01) |
| *B29C 64/153* | (2017.01) |
| *B28B 1/00* | (2006.01) |
| *B28B 17/00* | (2006.01) |
| *B29C 64/386* | (2017.01) |
| *B22F 10/30* | (2021.01) |
| *G05B 19/4099* | (2006.01) |
| *B22F 10/20* | (2021.01) |

(52) U.S. Cl.
CPC ........ *B28B 17/0081* (2013.01); *B29C 64/153* (2017.08); *B29C 64/386* (2017.08); *B33Y 10/00* (2014.12); *B33Y 30/00* (2014.12); *B33Y 50/02* (2014.12); *G05B 19/4099* (2013.01); *B22F 10/30* (2021.01); *G05B 2219/35215* (2013.01)

(58) Field of Classification Search
USPC ......................................................... 264/482
See application file for complete search history.

(56) References Cited

U.S. PATENT DOCUMENTS

| | | | | |
|---|---|---|---|---|
| 2002/0084940 | A1* | 7/2002 | Dettloff | G06K 7/10336 343/742 |
| 2003/0028407 | A1* | 2/2003 | Ibaraki | B23K 26/067 700/173 |
| 2013/0270750 | A1* | 10/2013 | Green | B23K 26/046 264/497 |
| 2014/0034511 | A1 | 2/2014 | Cordes et al. | |
| 2014/0271328 | A1* | 9/2014 | Burris | B33Y 10/00 419/53 |
| 2014/0344511 | A1* | 11/2014 | Kim | G06F 11/0778 711/105 |
| 2015/0283611 | A1 | 10/2015 | Takezawa et al. | |
| 2016/0114432 | A1* | 4/2016 | Ferrar | B22F 12/00 219/76.12 |
| 2016/0136730 | A1* | 5/2016 | McMurtry | B22F 10/20 425/162 |
| 2017/0021572 | A1 | 1/2017 | Wiesner et al. | |
| 2017/0173737 | A1* | 6/2017 | Gray | B33Y 30/00 |
| 2017/0210073 | A1 | 7/2017 | Frontera et al. | |

FOREIGN PATENT DOCUMENTS

| | | |
|---|---|---|
| CN | 105303818 A | 2/2016 |
| CN | 105492188 A | 4/2016 |
| JP | 2004/253006 A | 9/2004 |
| JP | 2014/229313 A | 12/2014 |
| JP | 2015/199195 A | 11/2015 |
| JP | 2016/527101 | 9/2016 |
| JP | 2017/082321 A | 5/2017 |
| JP | 2017/141510 A | 8/2017 |
| WO | WO2014/199134 A1 | 12/2014 |

OTHER PUBLICATIONS

Jason Cong, et al: "Multi-Way VLSI Circuit Partitioning Based on Dual Net Representation", internet article, 1994, XP002781099, Retrieved from the Internet: URL:http://ilpubs.stanford.edu:8090/49/1/1994-16.pdf [retrieved on May 16, 2018].
Ian Gent, et al: "Phase Transitions and Annealed Theories: Number Partitioning as a Case Study", internet article, 1996, XP002781090, Retrieved from the Internet: URL:http://citeseerx.ist.psu.edu/viewdoc/summary? doi=10.1.1.2.4475 [retrieved on May 16, 2018].
Richard E. Korf: "A Complete Anytime Algorithm for Number Partitioning", internet article, Jun. 27, 1997, XP002781089, Retrieved from the Internet: URL:http://citeseerx.ist.psu.edu/viewdoc/download?doi=10.1.1.90.993&rep=rep1&type=pdf [retrieved on May 16, 2018].
Maogang Wang et al: "Multi-way Partitioning Using Bi-partition Heuristics", internet article, Feb. 2000, XP002781098, Retrieved from the Internet: URL:https://www.researchgate.net/publication/3842965_Multi-way_Partitioning_Using_Bi-partition_Heuristics [retrieved on May 16, 2018].
Stephan Mertens: "A physicist's approach to number partitioning", internet article, Nov. 23, 2000, XP002781091, Retrieved from the Internet: URL:https://arxiv.org/pdf/cond-mat/0009230.pdf [retrieved on May 16, 2018].
Stephan Mertens: "The Easiest Hard Problem: Number Partitioning", internet article, Oct. 18, 2003, XP002781092, Retrieved from the Internet: URL:https://arxiv.org/ftp/cond-mat/papers/0310/0310317.pdf [retrieved on May 16, 2018].
Huiqun Liu, et al: "Network Flow Based Multi-Way Partitioning with Area and Pin Constraints", internet article, 2007, XP002781100, Retrieved from the Internet: URL:http://citeseerx.ist.psu.edu/viewdoc/download?doi=10.1.1.49.1229&rep=rep1&type=pdf [retrieved on May 16, 2018].
Richard E. Korf: "Multi-Way Number Partitioning", Internet article, 2009, XP002781096, Retrieved from the Internet: URL:https://pdfs.semanticscholar.org/1e20/4ff77f3f53a7ae6e320c588253e8e4504a46.pdf [retrieved on May 16, 2018].
Richard E. Korf: "A Hybrid Recursive Multi-WayNumber Partitioning Algorithm", internet article, 2011, XP002781095, Retrieved from the Internet: URL:https://pdfs.semanticscholar.org/4b24/f0557c7868d36301c8a402e52ae0ffd0013e.pdf [retrieved on May 16, 2018].
Michael D. Moffitt: "Search Strategies for Optimal Multi-Way Number Partitioning", internet article, 2013, XP002781097, Retrieved from the Internet: URL:https://www.ijcai.org/Proceedings/13/Papers/099.pdf [retrieved on May 16, 2018].
Marc-André Isenberg: "Produktionsplanung und -steuerungin mehrstufigen Batchproduktionen", internet article, Dec. 20, 2016, XP002781094, Retrieved from the Internet: URL:https://elib.suub.uni-bremen.de/edocs/00105021-1.pdf [retrieved on May 16, 2018].
Anonymous: "Conceptlaser", internet article, Jul. 12, 2017, XP002781088, Retrieved from the Internet: URL:https://web.archive.org/web/20170712173140/https://www.concept-laser.de/produkte/maschinen.html [retrieved on May 16, 2018].
Anonymous: "Partition problem", internet article, Aug. 22, 2017, XP002781093, Retrieved from the Internet: URL:https://en.wikipedia.org/w/index.php?title=Partition_problem&oldid=796716370 [retrieved on May 15, 2018].
Chinese Search Report and Office Action Corresponding to Application No. 201711461771 dated Aug. 31, 2020.
European Search Opinion Corresponding to Application No. 17197619.4.
European Search Report Corresponding to Application No. 17197619 dated May 16, 2018.
Japanese Office Action Corresponding to Application No. 2018105772 dated Jul. 29, 2019.

* cited by examiner

METHOD FOR OPERATING AN APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 197 619.4 filed Oct. 20, 2017, the contents of which is incorporated herein by reference in its entirety as if set forth verbatim.

The invention relates to a method for operating at least one apparatus for additively manufacturing of three-dimensional objects by means of successive layerwise selective irradiation and consolidation of layers of a build material which can be consolidated by means of an energy beam, wherein at least one object is being built by successively irradiating layers of the object in a build plane, wherein at least one part of a layer of the object is assigned to be irradiated by a first energy beam and at least one other part of a layer of the object is assigned to be irradiated by another energy beam.

Such methods for operating additive manufacturing apparatuses are generally known in prior art. Said apparatuses may be adapted to generate more than one energy beam, e.g. by providing more than one beam source and/or by dividing a generated energy beam into at least two sub-beams. The at least two energy beams are used to, in particular simultaneously, irradiate build material in the build plane in that the total manufacturing time can be reduced compared to using only one energy beam.

Typically, the user decides and manually assigns which layers of each object or which part of a layer of each object is irradiated by which energy beam. For example, if more than one object is built in the same manufacturing process, e.g. at least two objects on the same build plane, the user assigns each object to one beam source, i.e. to be irradiated with one energy beam. Regarding manufacturing processes with multiple different objects to be built, this approach may lead to an uneven distribution of workload, i.e. writing time between the energy beams. Especially, if the objects differ, in particular in their shape and/or cross-section(s) and/or their dimensions, the chosen work load or load distribution, respectively, is not equal when entire objects are assigned to single energy beams, wherein the unevenly distributed irradiation time leads to downtimes of single energy beams and an increase of the overall manufacturing time, since one object (or at least part of a layer) assigned to one of the energy beams may already be completed and at least one other object (or at least part of a layer) is not yet finished.

Further, in particular regarding complex shaped objects and/or multiple objects and/or different objects, a manual assignment of layers of the various objects (or parts thereof) is laborious and time-consuming. Additionally, the finding of the overall minimum of the manufacturing time is difficult using the described approach, as the user may only be able to roughly estimate the writing time required for the individual objects or layers or parts thereof. Additionally, the per-object workload may change from layer to layer.

Therefore, it is an object to the present invention to provide a method for operating an apparatus for additively manufacturing of three-dimensional objects, wherein the overall manufacturing time can be reduced.

The object is inventively achieved by a method according to claim 1. Advantageous embodiments of the invention are subject to the dependent claims.

The method described herein is suitable to be performed on an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

A respective apparatus may comprise a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that the parts of layers are assigned to be irradiated by one of the at least two energy beams based on a Huffman coding. Thus, the respective apparatus is adapted to generate at least two energy beams that are used to irradiate a build material in a successive layerwise manner to manufacture the at least one object. In that, each layer is selectively irradiated and thereby consolidated by the energy beams, for example laser beams. After each irradiation step a fresh layer of build material may be applied onto the previously irradiated layer of build material.

To make best use of the at least two energy beams, each layer may be sub-divided into several parts, in particular, if only one object is manufactured in the build process. It is also possible, if at least two objects are manufactured in the same manufacturing process, i.e. on the same build plane of the same apparatus, to assign entire layers of the at least two objects to one of the energy beams. Of course, when manufacturing more than one object simultaneously, the layers may also be sub-divided into respective parts and be assigned individually to one of the energy beams.

The manufacturing process of each of the objects can be sub-divided in that the entire object may be assigned to one of the energy beams or the assignment is chosen regarding each layer of the object or that at least one layer may be sub-divided in at least two parts, wherein the respective parts may be assigned to different energy beams. For the sake of convenience the case of assigning at least two parts of at least one layer to different energy beams will be described throughout the application, wherein all features, details and advantages described, are fully transferable to the other cases, in which an entire object or entire layers are assigned to the respective energy beams.

According to the present invention, the assignment of the parts of the layers is based on a Huffman coding. Thus, the respective parts of the layers do not have to be assigned to be irradiated by the individual energy beams manually, but the assignment can be performed automatically. Hence, an essentially equal distribution of the workloads of the energy beams can be assured. The automated assignment therefore, defines which energy beam irradiates which parts of the various layers of the at least one object throughout the manufacturing process. Inventively, the principle of the Huffman coding is transferred to additive manufacturing processes, wherein instead of using the frequency of appearance of single symbols as in the conventional Huffman coding, the irradiation time (writing time) of each part is used. Hence, in advance it can be estimated or calculated how long it takes for one of the energy beams to irradiate the respective part of the layer. The resulting determined writing time forms the basis for the assignment, as will be described subsequently.

Thus, the single layers of the at least one object to be manufactured are sub-divided and can be characterized by their irradiation time, i.e. the time required to irradiate the part. The assignment of the single parts to be irradiated by the energy beams therefore, takes the corresponding irradiation time into account, wherein based on a Huffman coding, a distribution of workload over the available energy beams is performed. The described distribution of the parts to be irradiated is preferably performed automatically and a manual assignment is not necessary. This assures a distribution of irradiation times over the available energy beams as equal as possible.

According to a first embodiment of the method, a Huffman tree is generated, wherein at least two parts of layers to be irradiated are sorted in different nodes and/or sub-trees of the Huffman tree dependent on a determined, in particular an estimated or a calculated, writing time required to irradiate the respective parts. Therefore, a writing time or irradiation time, respectively, can be estimated or calculated for each part of the layers that are to be irradiated. Dependent on the determined writing time, the energy beam requires to irradiate the respective part, the parts can be characterized, in particular sorted in different nodes and/or the nodes can be grouped to sub-trees of the Huffman tree. Thus, as in a typical Huffman coding, a hierarchic tree structure can be generated, wherein the generated (Huffman) tree comprises multiple nodes and/or sub-trees. The parts itself can be regarded as leaves, wherein the root can be regarded as the entire manufacturing process that is connected with the leaves over edges and the already described nodes (sub-trees).

The Huffman tree, as described before, may be generated by performing the following steps:
  determining a writing time for at least two parts of layers of the object
  sorting the parts of layers to be irradiated in the Huffman tree dependent on the determined writing time, wherein each part of a layer to be irradiated forms a leaf in the Huffman tree, wherein each leaf is connected to the root of the Huffman tree via at least one node
  grouping the nodes to sub-trees, wherein each two nodes and/or sub-trees comprising the leaves with the lowest writing times are grouped to a sub-tree
  grouping the nodes and/or sub-trees to sub-trees until only one tree remains Thus, the object may in a first step be divided into layers and/or parts that subsequently can be distributed to be irradiated with the available energy beams. Typically, object data are provided for the at least one object to be manufactured, for example slice-data or CAD-data (computer aided design). Afterwards, a writing time for the respective parts, layers or objects can be determined. The writing time required for an energy beam to irradiate the respective part, layer or object. In other words, the writing time indicates how long the respective energy beam is occupied with irradiating the corresponding structure or pattern, respectively.

Dependent on the determined writing time, the parts can be sorted in the Huffman tree. The single parts thereby form the leaves of the Huffman tree and are connected (over edges) via nodes to the root of the Huffman tree representing the entire manufacturing process or the build job, respectively. Further, nodes via which the leaves are connected to the root (over edges) can be grouped to sub-trees in that the two nodes containing the leaves with the lowest writing times are sequentially grouped to one sub-tree. The procedure is repeated, wherein two nodes or two sub-trees or one node and one sub-tree are grouped until only one tree (Huffman tree) remains.

According to another embodiment of the method, the generated Huffman tree may be divided into sub-trees, wherein the number of sub-trees equals the number of (available and/or suitable) energy beams. Hence, the number of energy beams available is taken into account, in that the Huffman tree is divided into its sub-trees in that each sub-tree can be assigned to one of the available energy beams. In other words, each energy beam irradiates the parts, layers or objects contained as leaves in the sub-tree assigned to the corresponding energy beam. Based on the distribution of parts, layers or objects into the sub-trees, an equal distribution of writing time over the single sub-trees is assured. Thus, the single sub-trees contain leaves (parts, layers or objects) with essentially equal writing times. Of course, the parts and/or layers contained in one sub-tree do not need to belong to the same layer/object, but may belong to different layers/objects.

According to another embodiment, if at least two objects are irradiated in the same manufacturing process, the respective parts of a layer of a first object and at least one other object may be irradiated solely by the assigned energy beam. Every available energy beam can therefore, irradiate the parts, layers or objects that are assigned to the energy beam based on the Huffman coding, as described before. A manual distribution of parts, layers or objects to the individual energy beams is therefore, not necessary. Every energy beam irradiates each layer (or the parts) that is assigned via the Huffman coding, i.e. based on the estimated or calculated writing time. Thus, an assignment of parts, layers or objects to the energy beam is not restricted to single layers or objects, in that two or more different energy beams can irradiate parts of the same layer or object simultaneously or sequentially.

According to another embodiment of the method, all parts of the first object may entirely be assigned to be irradiated with a first energy beam and all parts of the at least one other object may be entirely assigned to be irradiated with the at least one other energy beam. Therefore, an assignment of entire objects to different energy beams is possible, for example dependent on the writing time or other parameters of the manufacturing process.

The method can further be improved in that a manufacturing time of the parts of the layers of the object is determined, whereby the assignment of parts or objects to the respective energy beam is performed in that the total manufacturing time is minimized. Thus, the assignment of parts, layers or objects to the different available energy beams can take the total manufacturing time of the entire manufacturing process into account, which may contain a plurality of objects to be manufactured. Thus, the total manufacturing time can be minimized. Therefore, the distribution of parts to be irradiated is not limited to the current object that is manufactured but the entire manufacturing process is taken into account in that parts or objects assigned to energy beams are assigned to the available energy beams to minimize the total manufacturing time.

An existing, in particular completed, assignment of different parts to different energy beams can further be optimized using at least one algorithm. Thus, the result of the method performed based on the Huffman coding, as described before, can be optimized using at least one algorithm, in particular a local search algorithm. By using a respective algorithm the finding of local minima can be avoided and it can further be assured that the overall minimum of the manufacturing time is found and the parts are assigned accordingly.

Another embodiment of the method suggests that a part of an object is only assigned to be irradiated with an energy beam capable of irradiating the respective part. Thus, different features of different energy beams can be taken into account, such as the position of the respective part on the build plane and, for example, the region of the build plane that can be irradiated with the respective energy beam. The described embodiment allows for ensuring that every part can only be assigned to energy beams that are adapted to irradiate the respective region of the build plane. For example, the build plane may be sub-divided into multiple regions, wherein different energy beams are (locally) assigned to different regions so that an energy beam may not be adapted to irradiate every region, in particular a part arranged in another region the energy beam is not adapted to irradiate. An assignment based on the Huffman coding as described before to the respective energy beam is possible, but maybe would not lead to the minimum of the manufacturing time, since, as the described energy beam is not adapted to irradiate the part, another energy beam would have to be used.

Further, different parts of the build plane, in particular by using different build materials, may only be irradiated by specific energy beams (different energy, different wavelength, different spot size, different beam source). The method according to the described embodiment ensures that the parts assigned to the respective energy beam can be irradiated with that energy beam.

Besides, the invention relates to a method for assigning at least one part of a layer of at least one three-dimensional object to be additively manufactured by means of successive layerwise selective irradiation and consolidation of the layers of a build material which can be consolidated by means of an energy beam, wherein at least one object is being built by successively irradiating layers of the object in a build plane, wherein at least one part of at least one layer of the object is assigned to be irradiated by a first energy beam and at least one other part of at least one layer of the object is assigned to be irradiated by another energy beam, wherein the parts of layers are assigned to be irradiated by one of the at least two energy beams based on a Huffman coding.

Preferably, the method is performed in connection, in particular in advance, with the method for operating at least one apparatus for additively manufacturing three-dimensional objects. Self-evidently, all features, details and advantages described with respect to the method for operating the apparatus are fully transferable to the method for assigning at least one part of a layer of at least one three-dimensional object to be additively manufactured by a respective apparatus.

Further, the invention relates to an apparatus for additively manufacturing three-dimensional objects by means of successive layerwise selective irradiation and consolidation of layers of a build material which can be consolidated by means of an energy beam, comprising at least one beam generating unit configured to generate at least two energy beams or at least two beam generating units each configured to generate at least one energy beam, for manufacturing at least one object by successively irradiating layers of the object in a build plane, wherein at least one part of at least one layer of the object is assigned to be irradiated by a first energy beam and at least one other part of one layer of the object is assigned to be irradiated by another energy beam, wherein a control unit provided that is configured to assign the parts to the at least two energy beams based on a Huffman coding.

Of course, all features, details and advantages described with respect to the method for operating the apparatus and the method for assigning at least one part of at least one layer of at least one three-dimensional object to be additively manufactured by a respective apparatus are fully transferable to the inventive apparatus. In particular, the inventive apparatus is adapted to perform the inventive methods.

Figure 2:
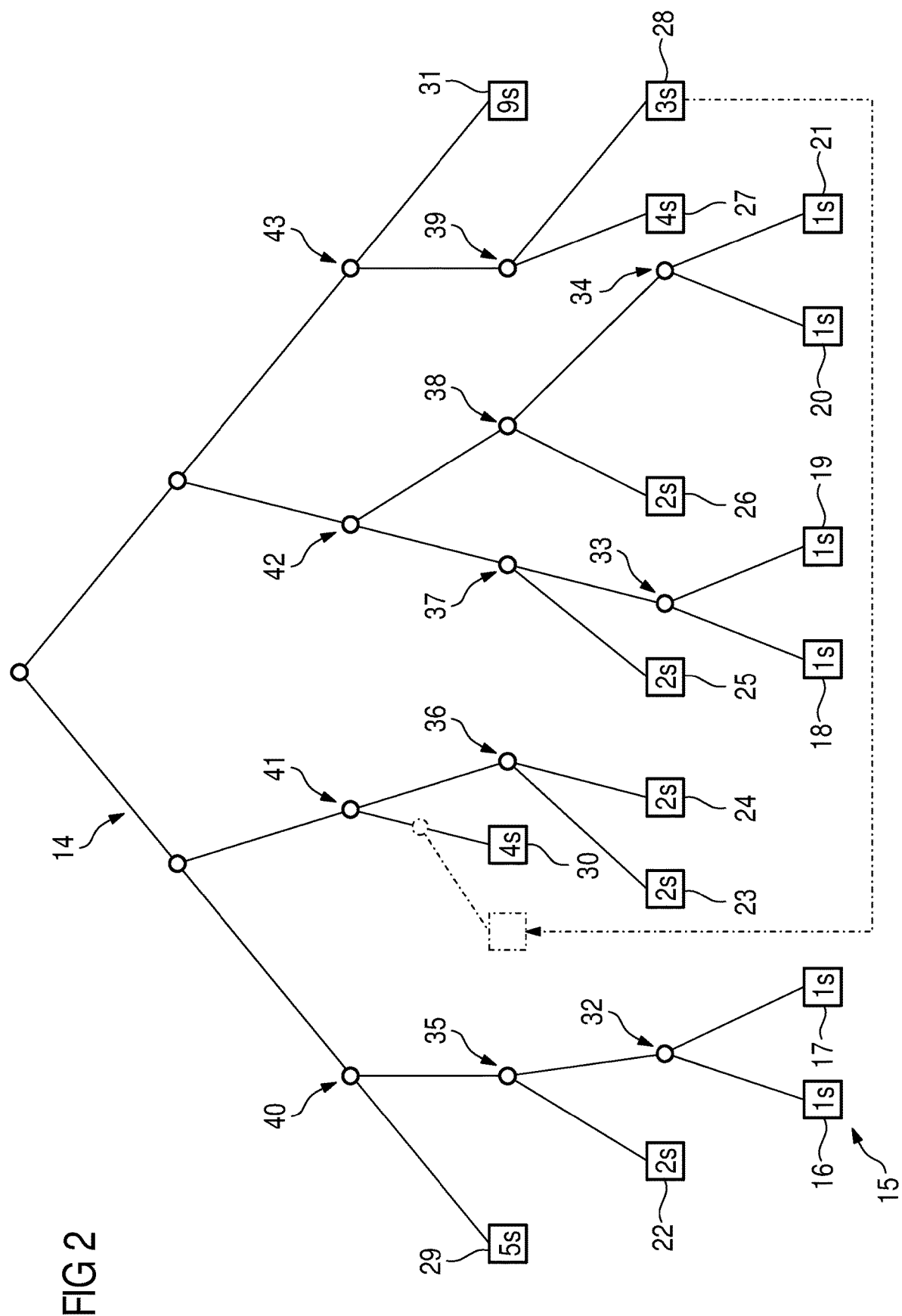

Exemplary embodiments of the invention are described with reference to the Fig. The Fig. are schematic diagrams, wherein FIG. 1 shows an inventive apparatus; and FIG. 2 shows a hierarchic tree as result of the inventive method.

FIG. 1 shows an apparatus 1 for additively manufacturing of three-dimensional objects 2-5 by means of successive layerwise selective irradiation and consolidation of layers 6 of a build material.

The apparatus 1 further comprises an irradiation device 7 comprising four beam generating units 8-11 that, for example, comprise beam sources adapted to generate energy beams 12, e.g. electron beams or laser beams, such as laser diodes and corresponding beam guiding units (not shown) adapted to guide the generated energy beams 12 onto a build plane 13 and along a beam path (not shown) extending in the build plane 13.

The irradiation device 7 is controlled by a control unit 44 in that the control unit 44 is adapted to control the single beam generating units 8-11 and the corresponding beam guiding units. Each of the beam generating units 8-11 is adapted to generate at least one energy beam 12, wherein it is also possible that each of the beam generating units 8-11 is adapted to generate more than one energy beam 12 simultaneously. The control unit 44 further is adapted to assign at least one part of a layer 6 of one of the objects 2-5 to one of the beam generating units 8-11. In other words the control unit 44 defines which layer 6 of which object 2-5 or which part thereof is irradiated using an energy beam 12 generated by one of the beam generating units 8-11. The section of the objects 2-5 that has not yet been manufactured in the manufacturing process is depicted in FIG. 1 as a dashed line.

The assignment the control unit 44 performs is based on a Huffman coding in that, in particular in advance to or during the manufacturing process, the objects 2-5 are divided into parts of the layers 6, wherein the layers 6 are sub-divided into the respective parts. The assignment of the workload of the single beam generating units 8-11 is performed with regard to the finding of a global minimum of the total manufacturing time. To avoid an uneven distribution of the writing time of the objects 2-5 over the beam generating units 8-11 the control unit 44 performs the assignment of the parts of the layers 6 based on a Huffman coding. The objects 2-5 may differ from each other, in particular regarding their shape and/or their cross-sections and/or their dimensions, wherein the corresponding parts of the layers 6 of the objects 2-5 require different writing times.

The assignment of parts 16-31 (FIG. 2) of the layers 6 to the different beam generating units 8-11, the Huffman Coding forms the basis for, is described in detail with respect to FIG. 2. For the sake of convenience, the total number of parts 16-31 is only sixteen. Of course, the number of layers 6 of each of the objects 2-5 would exceed the number of sixteen, accordingly would the number of parts 16-31.

FIG. 2 shows an exemplary Huffman tree 14. The leaves 15 represent the sixteen parts 16-31 of layers 6 of the objects 2-5. Since the diameter or the cross-section, respectively, of each object 2-5 may differ, or may vary in build direction (essentially perpendicular to the build plane 13), the different layers 6 and the different objects 2-5 require different writing times. Hence, assigning one object 2-5 to one beam generating unit 8-11 would result in an uneven distribution of writing times over the beam generating units 8-11. The writing times according to this exemplary embodiment, as depicted in FIG. 2, are to be understood as exemplary and depend, as described before, on various parameters of the respective part 16-31 of the layer 6 of one of the objects 2-5.

In other words, the layers 6 of all objects 2-5 are subdivided into the parts 16-31 to be independently assigned to one of the energy beams 12 generated by one of the beam generating units 8-11. The control unit 44 therefore, estimates or calculates the writing time required for each of the parts 16-31 and the Huffman tree 14 is generated.

To generate the Huffman tree 14 the parts 16-31 have to be sorted into sub-trees, wherein each two parts 16-31 with the lowest determined writing times are grouped into one node/are contained in one sub-tree. For example, the parts 16 to 21 each require a writing time of 1 second, the parts 22-26 each require a writing time of 2 seconds, the part 27 requires a writing time of 4 seconds, the part 28 requires a writing time of 3 seconds, the part 29 requires a writing time of 5 seconds, the part 30 requires a writing time of 4 seconds and the part 31 requires a writing time of 9 seconds. This results in a total writing time of 41 seconds that needs to be distributed over the four beam generating units 8-11.

Thus, grouping the nodes 16-21 results in sub-trees 32, 33 and 34 each of the nodes connecting the sub-trees 32, 33 and 34 therefore, contains parts 16-21 with the resulting writing time of 2 seconds. Further, the part 22 is grouped with the sub-tree 32 resulting in the sub-tree 35. Accordingly, the parts 23 and 24 as well as the part 25 and the sub-tree 33 are grouped resulting in the sub-trees 36, 37. The sub-trees 35, 36 each comprise parts requiring a manufacturing time of 4 seconds, since for example the sub-tree 35 contains the sub-tree 32 with a writing time of 2 seconds and the part 22 with a writing time of 2 seconds.

Further, the sub-tree 34 is grouped with the part 26 to form the sub-tree 38 and the parts 28, 27 are grouped to the sub-tree 39. The sub-tree 40 is built by grouping the sub-tree 35 with the part 29 and the sub-tree 41 is formed by grouping the sub-tree 37 with the sub-tree 36. The sub-tree 42 results by combining the sub-tree 38 and part 30, wherein the sub-tree 43 is built combining the sub-tree 39 with the part 31.

Subsequently, the total manufacturing time of 41 seconds is distributed over the four beam generating units 8-11 by dividing the Huffman tree 14 in the third layer which comprises the sub-trees 40-43. Hence, the generated Huffman tree 14 is separated into sub-trees that are assigned to the beam generating units 8-11. For example, the sub-tree 40 is assigned to the beam generating unit 8 with a total writing time of 9 seconds, the sub-tree 41 is assigned to the beam generating unit 9 with a total writing time of 8 seconds, the sub-tree 42 is assigned to the beam generating unit 10 with a total writing time of 8 seconds and the sub-tree 43 is assigned to the beam generating unit 11 with a total writing time of 16 seconds.

Thus, the total manufacturing time of 41 seconds is essentially equally distributed over the beam generating units 8-11, resulting in the manufacturing process to complete in 16 seconds. The resulting distribution may further be improved by using an algorithm, such as a local search algorithm.

Using local search, the original part 28 with a writing time of 3 seconds, now part of the sub-tree 39 which is part of the sub-tree 43 with a combined writing time of 16 seconds, may be moved to sub-tree 41 with a combined writing time of 8 seconds, resulting in an improved workload distribution. This move of part 28 (depicted via a dashed line) results in sub-tree 41 to complete in 11 seconds and sub-tree 43 to complete in 13 seconds. With the remaining writing times of 9 seconds for sub-tree 40 and 8 seconds for sub-tree 42, the manufacturing process can be completed in 13 seconds using beam generating units 8-11 concurrently.

This local search algorithm can be repeated, as long as new improvements to the workload distribution are found that reduce the maximum of the manufacturing times across all beam generating units 8-11.

The invention claimed is:

1. A method of additively manufacturing three-dimensional objects, the method comprising:
   determining, by a control unit, for respective ones of a plurality of layers of one or more objects to be additively manufactured, an assignment of respective ones of a plurality of layer portions to respective ones of a plurality of energy beams; and
   selectively consolidating sequential layers of a build material to form the respective ones of the plurality of layers of the one or more objects by irradiating, with an irradiation device, the plurality of layer portions with the respective ones of the plurality of energy beams according to the determined assignment;
   wherein determining the assignment of respective ones of the plurality of layer portions to respective ones of the plurality of energy beams comprises:
      determining a writing time for each of the plurality of layer portions;
      forming a plurality of subtrees by sequentially grouping the plurality of layer portions with one another based on the determined writing time of each of the plurality of layer portions;
      forming a plurality of nodes of the plurality of subtrees such that an ungrouped respective one of the plurality of layer portions having a lowest determined writing time is grouped with either:
         a next ungrouped respective one of the plurality of layer portions having a next lowest determined writing time, or
         a previously formed node that groups a then-ungrouped respective one of the plurality of layer portions having a then-lowest determined writing time and a then-next ungrouped respective one of the plurality of layer portions having a then-next lowest determined writing time; and
      assigning, by the control unit, respective ones of the plurality of subtrees to respective ones of the plurality of energy beams, such that the respective ones of the plurality of subtrees have an essentially equal writing time, the writing time being an estimated or calculated time required to irradiate the respective ones of the plurality of layer portions.

2. The method of claim 1, wherein assigning respective ones of the plurality of subtrees to respective ones of the plurality of energy beams comprises:
assigning a first one of the plurality of subtrees to a first one of the plurality of energy beams; and
assigning a second one of the plurality of subtrees to a second one of the plurality of energy beams.

3. The method of claim 2, wherein irradiating the plurality of layer portions with the respective ones of the plurality of energy beams according to the determined assignment comprises:
irradiating the first plurality of layer portions grouped in the first one of the plurality of subtrees with the first one of the plurality of energy beams; and
irradiating the second plurality of layer portions grouped in the second one of the plurality of subtrees with the second one of the plurality of energy beams.

4. The method of claim 3, comprising:
irradiating the first plurality of layer portions solely with the first one of the plurality of energy beams; and/or
irradiating the second plurality of layer portions solely with the first one of the plurality of energy beams.

5. The method of claim 1, wherein sequentially forming the plurality of subtrees comprises:
determining a writing time for respective ones of the plurality of layer portions; and
sorting the respective ones of the plurality of layer portions based on the determined writing time.

6. The method of claim 1, wherein respective one of the plurality of layer portions define a leaf connected to a root of one of the plurality of subtrees by at least one node.

7. The method of claim 1, wherein selectively consolidating sequential layers of the build material to form the respective ones of the plurality of layers of the object comprise:
irradiating a first one plurality of layer portions with the respective ones of the plurality of energy beams according to the determined assignment.

8. The method of claim 1, wherein the one or more objects comprise a first object and at least a second object, and wherein the method comprises:
irradiating a first plurality of layer portions corresponding to the first object solely with a first one of the plurality of energy beams; and
irradiating a second plurality of layer portions corresponding to the at least a second object solely with at least a second one or more of the plurality of energy beams.

9. The method of claim 1, wherein the one or more objects comprises a plurality of objects, and with respect to respective ones of the plurality of layers, respective ones of the plurality of layer portions encompass all or a portion of respective ones of the plurality of objects.

10. The method of claim 1, wherein the assignment of respective ones of the plurality of layer portions to respective ones of the plurality of energy beams minimizes the writing time with respect to at least some of the plurality of layers.

11. The method of claim 1, wherein the assignment of respective ones of the plurality of layer portions to respective ones of the plurality of energy beams minimizes the writing time of the one or more objects.

12. The method of claim 1, wherein the assignment of respective ones of the plurality of layer portions to respective ones of the plurality of energy beams minimizes total manufacturing time of the one or more objects.

13. The method of claim 1, wherein determining the assignment of respective ones of the plurality of layer portions to respective ones of the plurality of energy beams is performed using a local search algorithm.

14. The method of claim 13, comprising:
reassigning at least some of the plurality of layer portions to respective ones of the plurality of energy beams, wherein the reassigning reduces the total writing time for at least some of the plurality of layers.

15. The method of claim 13, comprising:
moving at least some of the subtrees to a different location, wherein moving at least some of the subtrees reduces the total writing time for at least some of the plurality of layers.

16. The method of claim 1, wherein the plurality of subtrees are analogous to a Huffman tree.

17. The method of claim 1, wherein sequentially forming a plurality of subtrees is performed using an algorithm analogous to Huffman coding.

18. The method of claim 1, wherein respective ones of the plurality of energy beams differ from one another in respect of at least one beam property, the at least one beam property comprising: energy, wavelength, spot size, and/or beam source.

19. The method of claim 1, wherein the one or more objects comprises a plurality of objects, and wherein at least a portion of respective ones of the plurality of objects are irradiated in part by a first one of the plurality of energy beams and in part by at least a second one of the plurality of energy beams.

20. The method of claim 17, wherein assigning a first one of the plurality of objects to a first energy beam and a second one of the plurality of objects to a second energy beam would result in different writing times between the first energy beam and the second energy beam.

* * * * *